US012617546B2

(12) United States Patent
Gilmore et al.

(10) Patent No.: US 12,617,546 B2
(45) Date of Patent: May 5, 2026

(54) MODULAR HYDROGEN-FUEL STORAGE ASSEMBLY

(71) Applicant: SAS Beyond Aerosapce, Cugnaux (FR)

(72) Inventors: Christopher K. Gilmore, Santa Monica, CA (US); James Mark Cousin, Marina Del Ray, CA (US); John-Paul Clarke, Austin, TX (US)

(73) Assignee: SAS BEYOND AEROSPACE, Cugnaux (FR)

( * ) Notice: Subject to any disclaimer, the term of this patent is extended or adjusted under 35 U.S.C. 154(b) by 248 days.

(21) Appl. No.: 18/311,209

(22) Filed: May 2, 2023

(65) Prior Publication Data

US 2023/0356856 A1 Nov. 9, 2023

Related U.S. Application Data

(60) Provisional application No. 63/337,972, filed on May 3, 2022.

(51) Int. Cl.
| | |
|---|---|
| *B64D 37/04* | (2006.01) |
| *B64D 37/30* | (2006.01) |
| *F17C 13/08* | (2006.01) |

(52) U.S. Cl.
CPC ............. *B64D 37/04* (2013.01); *B64D 37/30* (2013.01); *F17C 13/083* (2013.01);
(Continued)

(58) Field of Classification Search
CPC ........ F17C 2221/012; F17C 2270/0189; F17C 2223/0161; F17C 13/083;
(Continued)

(56) References Cited

U.S. PATENT DOCUMENTS 10,145,514 B2 * 12/2018 Carlander-Reuterfelt ..................
B63B 25/16
2005/0230554 A1 10/2005 Schoene
(Continued)

FOREIGN PATENT DOCUMENTS

DE 102019008558 A1 6/2021
EP 3718904 A1 10/2020
(Continued)

OTHER PUBLICATIONS

International Searching Authority, International Search Report and Written Opinion, PCT Patent Application PCT/US2023/020745, mailed Sep. 15, 2023, 20 pages.

*Primary Examiner* — Shawn M Braden
(74) *Attorney, Agent, or Firm* — CRGO Global; Steven M. Greenberg

(57) ABSTRACT

The present disclosure provides modular hydrogen-fuel storage assemblies with an external form factor corresponding to Unit Load Device (ULD) cargo containers, allowing the assemblies to be easily loaded into and stored in a cargo bay area of an aircraft. Each assembly can house one or more hydrogen fuel tanks containing liquid and gaseous hydrogen, which can be used to power an APU or other power system of the aircraft. Each assembly can include an internal cradle system for securing the tanks within the assembly, a ground servicing panel for refueling, a quick connection assembly for quickly coupling the assembly to the APU or other power system, a cold box for managing various fluid flow, and an avionics bay for controlling the various components of the assembly.

14 Claims, 9 Drawing Sheets

(52) U.S. Cl.
CPC .................. *F17C 2201/0109* (2013.01); *F17C 2201/035* (2013.01); *F17C 2201/054* (2013.01); *F17C 2205/0107* (2013.01); *F17C 2205/0111* (2013.01); *F17C 2205/013* (2013.01); *F17C 2205/0142* (2013.01); *F17C 2205/0157* (2013.01); *F17C 2205/0176* (2013.01); *F17C 2205/037* (2013.01); *F17C 2221/012* (2013.01); *F17C 2223/0123* (2013.01); *F17C 2223/0161* (2013.01); *F17C 2223/035* (2013.01); *F17C 2223/036* (2013.01); *F17C 2227/0337* (2013.01); *F17C 2250/043* (2013.01); *F17C 2250/0439* (2013.01); *F17C 2250/0452* (2013.01); *F17C 2270/0189* (2013.01)

(58) Field of Classification Search
CPC ........ F17C 2201/0109; F17C 2201/035; F17C 2201/054; F17C 2205/0107; F17C 2205/0111; F17C 2205/013; F17C 2205/0142; F17C 2205/0157; F17C 2205/0176; F17C 2205/037; F17C 2223/0123; F17C 2223/035; F17C 2223/036; F17C 2227/0337; F17C 2250/043; F17C 2250/0439; F17C 2250/0452; F17C 2201/0104; F17C 2201/056; F17C 2223/033; B64D 37/04; B64D 37/30; B64D 9/00; B64D 37/08

See application file for complete search history.

(56) References Cited

U.S. PATENT DOCUMENTS

| | | | | |
|---|---|---|---|---|
| 2015/0217869 | A1* | 8/2015 | Brunaux | F16L 1/00 |
| | | | | 244/58 |
| 2019/0248205 | A1 | 8/2019 | Moon et al. | |
| 2019/0322374 | A1* | 10/2019 | Moon | B64D 13/08 |
| 2021/0362871 | A1* | 11/2021 | Pitman | B64U 50/34 |

FOREIGN PATENT DOCUMENTS

| | | |
|---|---|---|
| ES | 1134258 U | 12/2014 |
| WO | 2013136282 A2 | 9/2013 |
| WO | 2021231647 A1 | 11/2021 |

* cited by examiner

MODULAR HYDROGEN-FUEL STORAGE ASSEMBLY

CROSS-REFERENCE TO RELATED APPLICATION

This non-provisional patent application claims priority to and the benefit of U.S. Provisional Patent Application No. 63/337,972, titled MODULAR HYDROGEN-FUEL STORAGE ASSEMBLY, filed May 3, 2023, which is incorporated herein in its entirety by reference thereto.

TECHNICAL FIELD

The present technology is directed toward hydrogen fuel storage and delivery systems for vehicles, and more particularly toward modular hydrogen-fuel storage and delivery systems for planes or other aircraft.

BACKGROUND

Hydrogen is a clean energy source that can be used to power various vehicles, including aircraft or other vehicles. The hydrogen fuel is typically stored in tanks or other selected vessels as a gaseous fuel or stored at cryogenic conditions in a liquid state. Hydrogen fuel provides a distinct advantage over other types of power sources. For example, aviation gas or jet fuel has specific energies that may generally range from about 43 MJ/kg to about 48 MJ/kg. In contrast, hydrogen has a specific energy that may generally range from about 120 MJ/kg to about 140 MJ/kg. Thus, using hydrogen as a fuel source for vehicles can reduce the fuel weight onboard vehicles, while providing a comparable amount of energy as other traditional sources of fuel. Further, burning carbon-based fuels generates exhaust with a variety of atmospheric contaminates, such as carbon dioxide. Consuming hydrogen for fuel, however, only emits benign or nontoxic byproducts, such as water, thereby reducing the environmental impacts of various modes of transportation that use hydrogen as a fuel source.

Even among aircraft having hydrogen-powered engines, APUs, or other powerplants, most do not have space to specifically house hydrogen fuel tanks. Moreover, hydrogen fuel tanks require various structures and systems unique to storing and managing hydrogen fuel. Requiring aircraft to be outfitted with such space and equipment can be costly and time-consuming and can deter the use of hydrogen fuel in aircraft. Thus, there is a need for systems and methods for loading and operatively coupling hydrogen fuel tanks to aircraft in an easy and quick manner.

SUMMARY

The technology of the present disclosure overcomes the above drawbacks and provides additional benefits. For example, one or more embodiments of the present technology provides a modular hydrogen-fuel storage assembly comprising housing that contains a refillable, reusable hydrogen fuel tank configured to contain hydrogen fuel. The housing has a front portion, a rear portion, a top portion, a bottom portion, and an interior portion. The housing has a size and shape corresponding to a Unit Load Device (ULD) cargo container. A hydrogen fuel plumbing system is positioned within the housing and connected to the hydrogen fuel tank for carrying hydrogen fuel to and from the hydrogen fuel tank. A cold box is contained within the housing, and at least a portion of the hydrogen fuel plumbing system is contained in the cold box. A quick connection assembly is coupled to the hydrogen fuel tank and positioned adjacent to the top portion of the housing. The quick connection assembly has one or more connectors configured to releasably connect with one or more external fuel lines coupled to an auxiliary power unit (APU) of an aircraft. A ground servicing panel is coupled to the housing and coupled to the hydrogen fuel tank, and an avionics bay is operatively coupled to the hydrogen fuel tank and removably contained in the interior portion of the housing. The modular hydrogen-fuel storage assembly is configured to be loaded into a cargo bay of the aircraft.

Another embodiment of the present technology provides a modular hydrogen-fuel storage assembly configured to be loaded into a cargo bay of an aircraft. The assembly has a modular housing that contains at least one liquid hydrogen fuel tank configured to contain liquid hydrogen fuel in a substantially cryogenic environment. The exterior of the housing has a size and shape corresponding to a Unit Load Device (ULD) cargo container. A hydrogen fuel plumbing system is positioned within the housing and connected to the liquid hydrogen fuel tank for carrying hydrogen fuel to and from the liquid hydrogen fuel tank. A quick connection assembly is coupled to the liquid hydrogen fuel tank and positioned on a top portion of the housing. The quick connection assembly has one or more connectors configured to releasably connect with one or more external fluid lines. The quick connection assembly is movable between locked and released positions, wherein the connectors are in sealable engagement with mating connectors of the external fluid lines when in the locked position, and the wherein the connectors are disengaged from the mating connectors of the external fluid lines when in the released position. The quick connection assembly is positioned to connect to the fluid lines that extend over the top portion of the housing.

Another embodiment of the present technology provides a modular hydrogen-fuel storage assembly that has a refillable, reusable liquid hydrogen fuel tank contained in the interior portion of a modular housing that has a size and shape corresponding to a Unit Load Device (ULD) cargo container. A hydrogen fuel plumbing system is positioned within the housing and is connected to the hydrogen fuel tank for carrying hydrogen fuel to and from the hydrogen fuel tank. A connection assembly is coupled to the hydrogen fuel tank and positioned adjacent to the top portion of the housing. The connection assembly has one or more connectors configured to releasably connect with one or more external fuel lines coupled to an external powertrain of a vehicle. A controller is operatively coupled to the hydrogen fuel tank and removably contained in the interior portion of the housing. The modular hydrogen-fuel storage assembly is configured to be loaded into a receiving bay of a vehicle and connected to a hydrogen-powered powertrain of the vehicle.

Another embodiment of the present technology includes a method of providing a modular hydrogen-fuel storage assembly to an aircraft. The method comprises loading the modular hydrogen-fuel storage assembly into a cargo bay of the aircraft, wherein the modular hydrogen-fuel storage assembly has a size and shape corresponding to a Unit Load Device (ULD) cargo container corresponding to a configuration of the cargo bay of the aircraft. The modular hydrogen-fuel storage assembly contains a liquid hydrogen fuel tank and a quick connection assembly fluidly coupled to the liquid hydrogen fuel tank. The modular hydrogen-fuel storage assembly is secured at a first position inside the cargo bay. A plurality of lines extending from a hydrogen-powered powertrain of the aircraft are coupled to a quick connection assembly of the modular hydrogen-fuel storage assembly. The quick connection assembly is positioned at a top portion of the modular hydrogen-fuel storage assembly.

BRIEF DESCRIPTION OF THE DRAWINGS

A better understanding of the features and advantages of the present disclosure will be obtained by reference to the following detailed description that sets forth illustrative embodiments, in which the principles of the disclosure are utilized, and the accompanying drawings.

Figure 1:
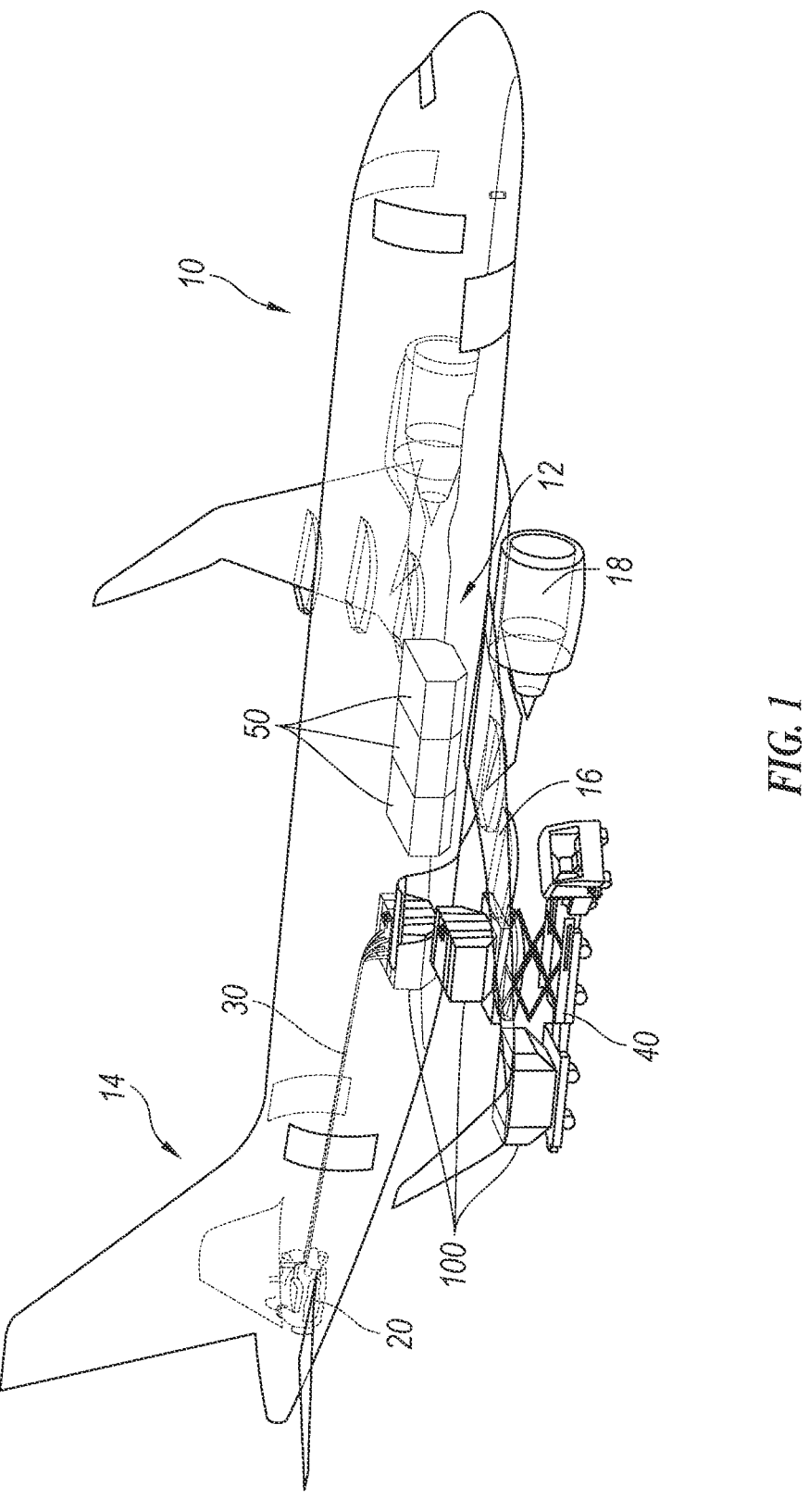
FIG. 1 is a schematic, partially transparent view of an aircraft configured for use with a modular hydrogen-fuel storage assembly in accordance with embodiments of the present technology.

A person skilled in the relevant art will understand that the features shown in the drawings are for purposes of illustrations, and variations, including different and/or additional features and arrangements thereof, are possible.

DETAILED DESCRIPTION

The present technology is directed to modular hydrogen-fuel storage assemblies, systems, and associated methods configured for use in vehicles, such as aircraft, having hydrogen-powered engines, auxiliary power units (APUs), or other powerplants. Specific details of the present technology are described herein with respect to FIGS. 1-13. Although many of the embodiments are described with respect to hydrogen-fuel storage assemblies or systems, it should be noted that other applications and embodiments in addition to those disclosed herein are within the scope of the present technology. Further, embodiments of the present technology can have different configurations, components, and/or procedures than those shown or described herein. Moreover, a person of ordinary skill in the art will understand that embodiments of the present technology can have configurations, components, and/or procedures in addition to those shown or described herein and that these and other embodiments can be without several of the configurations, components, and/or procedures shown or described herein without deviating from the present technology.

While various embodiments of the present technology are shown and described herein, it will be obvious to those skilled in the art that such embodiments are provided by way of example only. Numerous variations, changes, and substitutions may occur to those skilled in the art without departing from the scope of the present technology. It should be understood that various alternatives to the embodiments described herein may be employed. Further, components disclosed in connection with one described embodiment may be included or usable in or with other embodiments even if not specifically shown or described. Some components described or shown in connection with an embodiment may not be required and may be excluded while still being within the scope of the applicant's inventive technology.

In an aspect, the present disclosure provides modular hydrogen-fuel storage assemblies that are lightweight, transportable, and easily loadable onto and off of aircraft or other vehicles using existing conventional cargo handling equipment and systems. Each modular hydrogen-fuel storage assembly can have an external form factor and footprint (e.g., shape and size) consistent with a conventional cargo unit, such as a ULD cargo container, such that the assembly can be loaded onto and stored in the aircraft's cargo bay. Each assembly can include various coupling mechanisms that allow for convenient refueling on the ground, and quick and easy coupling to a powerplant (e.g., an APU) of the aircraft. The assemblies can be configured to allow line management within the cargo bay such that each assembly can be stacked adjacent to other modular hydrogen-fuel storage assemblies or conventional ULD cargo containers while minimizing the gaps in between.

Each assembly is configured to house one or more hydrogen fuel tanks, which are configured to hold a volume of hydrogen fuel that may comprise both liquid and gaseous hydrogen existing at varying temperatures and pressures dependent on requirements of the power system of the aircraft. The modular hydrogen-fuel storage assemblies include various systems and/or equipment for managing the hydrogen fuel (e.g., ensuring temperature, pressure, and safety levels), supporting the flow of gaseous hydrogen fuel from the one or more hydrogen fuel tanks to the power system of the aircraft, and mechanically securing the one or more hydrogen fuel tanks within each assembly.

FIG. 1 is a schematic, partially transparent view of an aircraft 10 configured for use with one or more modular hydrogen-fuel storage assemblies 100 in accordance with embodiments of the present technology. Each of the assemblies 100 has a shape and size corresponding to a standardized cargo unit, such as a Unit Load Device (ULD) cargo container (e.g., a conventional LD3-45 container). The shape and size of each assembly 100 allows the assembly to be safely and easily transported, installed onto, adjusted, and/or removed from a cargo bay 12 of the aircraft 10 via conventional handling equipment, such as existing Ground Support Equipment (GSE) 40. In particular, the assemblies 100 can be positioned to be in alignment with a cargo door 16 of the aircraft 10 with a conveyance assembly to for smooth and simple movement into or out of the cargo bay 12. As will be described in further detail below with respect to FIGS. 2-7, the one or more modular hydrogen-fuel storage assemblies 100 allow for line management such that the assemblies can be arranged adjacent to one another and/or conventional cargo units 50 inside the cargo bay 12 in any order.

Once loaded into and secured (e.g., via latches, anchors, or other tiedown features) inside the cargo bay 12, the assemblies 100 can be coupled to a power system of the aircraft 10, such as a hydrogen-powered auxiliary power unit (APU) 20 located in a tail assembly 14 of the aircraft 10 via one or more lines 30. As will be described in further detail below with respect to FIG. 5, the lines 30 can carry gaseous hydrogen, coolant, and/or other fluids to, from, or between the assembly 100 and the APU 20. The engines 18 can be fueled by standard, petroleum-based aviation fuel. In other embodiments, the engines 18 can be hydrogen-powered and the assemblies 100 can be coupled to the aircraft's fuel system to provide gaseous hydrogen fuel to the powertrains for the engines 18. The APU 20 and/or the engines 18 may include or be coupled to a fuel cell system with fuel cells configured to generate electricity through an electrochemical reaction between fuels. In other embodiments, fuel cells may be included in the assembly 100. The electricity generated by the fuel cells may be used to power the APU 20 and/or the engines 18.

In some embodiments, excess electricity generated by the fuel cells is stored in one or more energy storage units (e.g., batteries) for future use. In some embodiments, the aircraft 10 can be configured to have a hydrogen-powered powertrain with at least some of the components as disclosed and described in Applicant's U.S. Patent Application Publication No. 2022-0055762, titled Systems and Methods for Multi-Module Control of a Hydrogen Powered Hybrid Electric Powertrain, which is incorporated herein in its entirety by reference. In some embodiments, the electricity generated by the fuel cells may be used to drive one or more electric motors operatively coupled to a shrouded fan or an unshrouded fan. In other cases, the hydrogen can be burned in a jet engine, a turbofan engine, a turboprop engine, a turboshaft engine, a turbojet engine, or any other type of internal combustion engine compatible with any of the vehicles described herein.

The illustrated embodiment shows the aircraft 10 as a commercial aircraft, but other embodiments in accordance with the present technology can include other aircraft or other vehicles that have standardized cargo areas, equipment, and/or with predetermined form factors and footprints. The aircraft 10 or other vehicles may be manned (i.e., operated by a passenger on or in the aircraft) or unmanned (i.e., operated by an individual who is not on or in the aircraft). The aircraft may be autonomous or semi-autonomous.

Figure 2A:
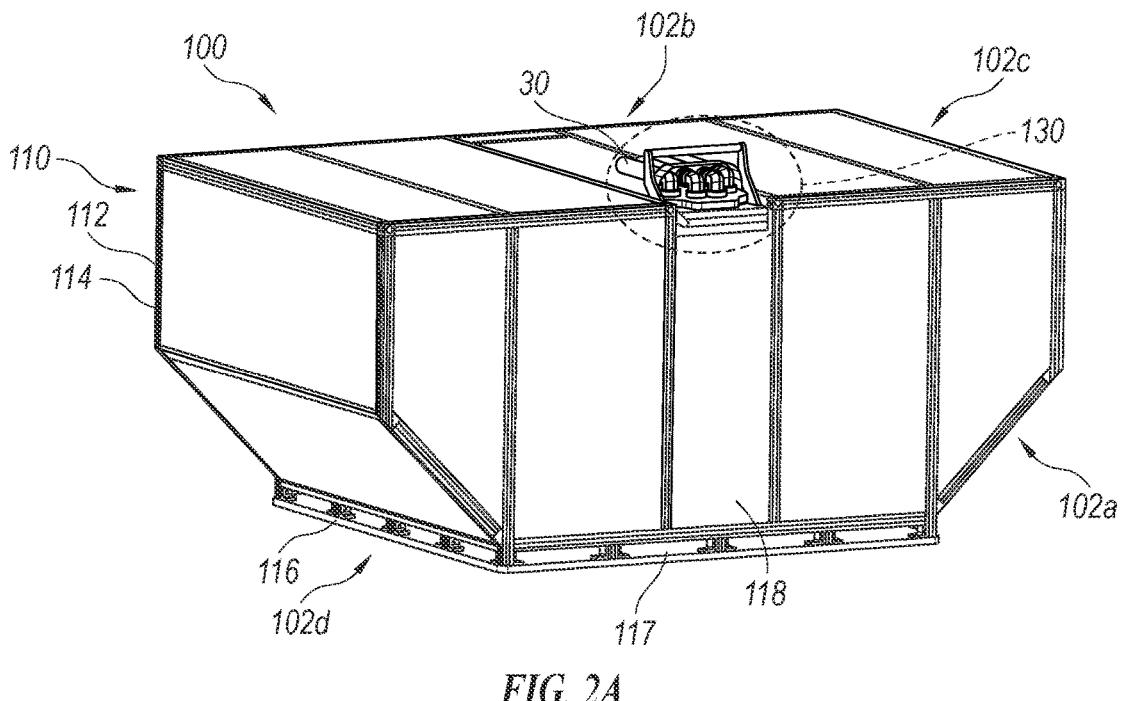
FIGS. 2A and 2B are front and rear perspective views, respectively, of a modular hydrogen-fuel storage assembly of an embodiment of the present technology.
Figure 2B:
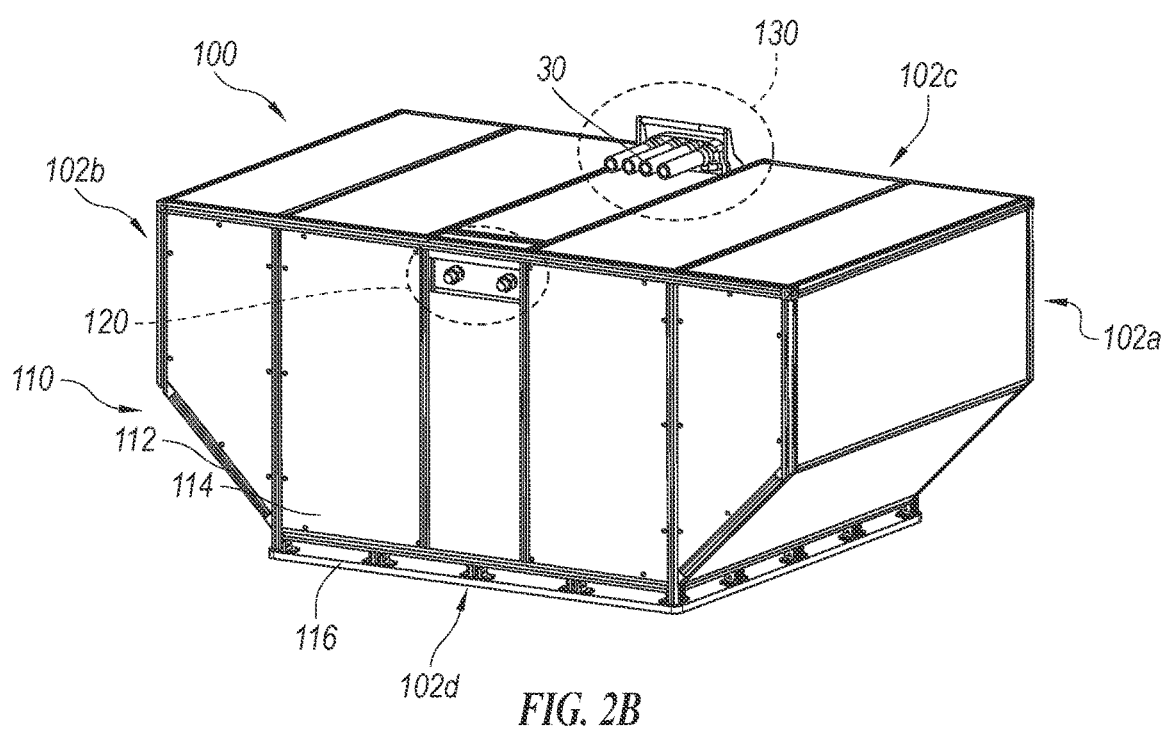

FIGS. 2A and 2B are front and rear perspective views, respectively, of the modular hydrogen-fuel storage assembly 100 of an embodiment of the present technology. The assembly 100 includes a front portion 102a, a rear portion 102b, a top portion 102c, and a bottom portion 102d. The assembly 100 includes a housing 100 with a frame 112 and one or more panels 114 configured to protect various components in an interior portion of the assembly 100. The housing 110 can have an external form factor such that the shape and size of the housing 110 corresponds to a Unit Load Device (ULD) cargo container. As described above with respect to FIG. 1, the shape and size of the housing 110 allows the assembly 100 to be safely and easily loaded into an existing cargo bay of an aircraft.

The bottom portion 102d includes a base 116 configured to engage and move along cargo roller tracks or roller panels in the aircraft's cargo bay 12. The base 116 also includes notches 117 that can receive tines of a forklift, further allowing the assembly 100 to be easily transported using conventional handling equipment. The front portion 102a includes an access hatch 118 proximate to the base 116. The access hatch 118 can be opened to allow an avionics bay (FIG. 7) to be inserted into or removed from the interior portion of the assembly 100, and can be closed to secure the avionics bay within the interior portion of the assembly 100.

The top portion 102c of the illustrated embodiment includes a quick connection assembly 130 proximate to the front portion 102a. As will be described in further detail below, the quick connection assembly 130 is configured to easily and quickly couple the assembly 100 to one or more lines 30 and provide various fluids to and/or from the assembly 100. In some embodiments, the top portion 102c can form or include a panel that can be moved between open and closed positions. In the open position, the panel is spaced apart from the housing's interior area to allow easy access to the assembly's components in the housing, such as for repair, maintenance, replacement, removal, etc. In the closed position, the panel covers the housing's interior area so as to enclose components of the assembly within the interior area of the housing. The rear portion 102b of the housing includes a ground servicing panel 120 proximate to the top portion 102c. As will be described in further detail below, the ground servicing panel 120 is configured to easily and quickly couple the assembly 100 to a hydrogen fuel supply external to the aircraft 10 (e.g., on the ground).

The assembly 100 can be coupled to the aircraft's air conditioning and ventilation system 160 to allow the interior area within the housing to be ventilated, either continuously or upon demand. Air or other gases from the interior portion of the assembly 100 can be removed from the assembly 100 and vented to the cargo bay 12 and/or outside the aircraft via a dedicated ventilation line. The ventilation helps to avoid any potential buildup of gaseous hydrogen within the housing 110. The rate of gaseous hydrogen extraction can be controlled by controlling the aircraft's air conditioning and ventilation system, which may be controlled locally by components on the avionics bay 150 and/or remotely from a cockpit of the aircraft 10. In some embodiments, the air conditioning and ventilation system 160 can be operatively coupled to the vent and vacuum lines 34 to further increase operational safety levels of the assembly 100. In some embodiments, the assembly 100 can also have one or more fire suppression systems.

In other embodiments, the housing 110 has an external form factor (e.g., shape and size) different from the illustrated example that still allows the assembly 100 to be safely and easily transported to and loaded into the cargo bay 12 of the aircraft 10 or other vehicle. In other embodiments, the various components described above can be positioned at different positions relative to the housing 110. For example, the quick connection assembly 130 can be coupled to the top portion 102c but proximate to the rear portion 102b or side portions of the assembly 100.

Figure 3:
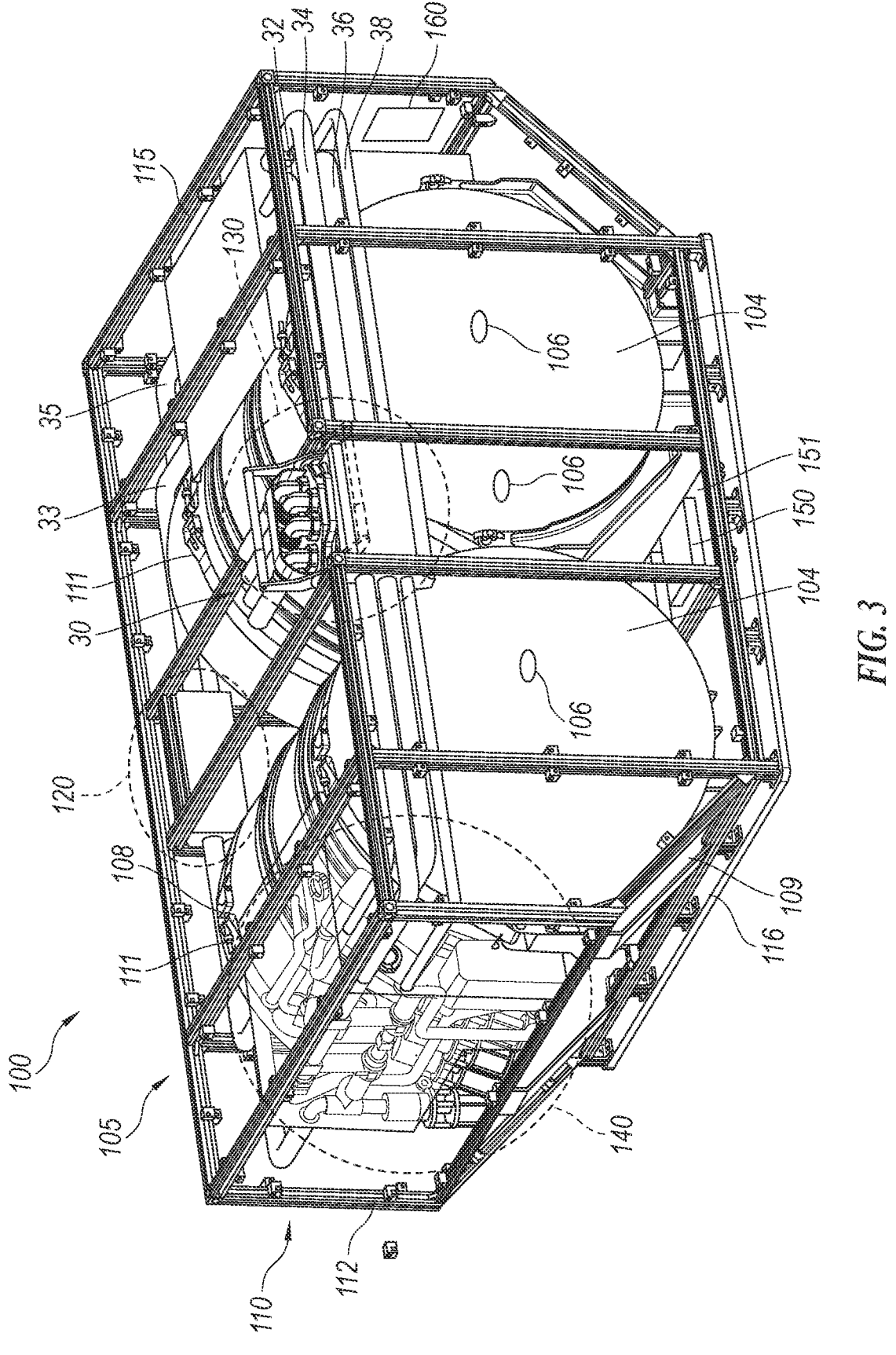
FIG. 3 is a perspective view of an interior portion of the modular hydrogen-fuel storage assembly of FIGS. 2A and 2B in accordance with embodiments of the present technology.

FIG. 3 is a perspective view of the modular hydrogen-fuel storage assembly 100 in accordance with embodiments of the present technology. In the illustrated embodiment, the panels 114 are shown removed from the frame structure 115 of the housing 110 to show the interior portion of the assembly 100. In the illustrated embodiment, the assembly 100 is sized and shaped to house two generally cylindrical hydrogen fuel tanks 104 with hemispherical endcaps in a side-by-side arrangement. The hydrogen fuel tanks 104 can be inserted into and removed from the assembly 100 through the top portion 102c when the top portion 102c is moved from the closed position (FIG. 3) to the open position. In some embodiments, the panels 114 are removably secured to the frame structures 115, so that the panels 114 can be easily and quickly replaced. For example, panels 114 can be removed and replaced if the panels are damaged or if panels have an external color scheme or markings (e.g., related to one airline) that need to be replaced with panels having a different color scheme or markings (e.g., related to another airline).

The illustrated assembly 100 includes an internal cradle system 108 positioned within the housing 100 and configured to securely support the hydrogen fuel tanks 104 within the housing 110 during transportation (e.g., from a hydrogen-fuel filling station to an airport), loading into the cargo bay 12, flight, etc. The tanks 104 can be fastened directly to cradles 109 of the cradle system 108. In other embodiments, strap assemblies 111 can securely and releasably retain the tanks on the cradles 109 of the cradle system 108. Other embodiments can use other retention features to securely interconnect the tanks to the cradle system to prevent any movement of the tanks within interior areas in the housing when in use.

Each tank 104 includes a plumbing system 105 configured to control the flow of liquid and/or gaseous hydrogen into and out of the tank 104. In some embodiments, the tanks include components and configurations as disclosed in U.S. Patent Application Publication No. US2022-0136656A1, titled Systems and Methods for Storing Liquid Hydrogen, filed Oct. 29, 2021, which is incorporated herein in its entirety by reference. The tanks 104 store the hydrogen fuel primarily in the liquid state at cryogenic conditions, and the liquid hydrogen is then gassified to provide gaseous hydrogen to the aircrafts fuel system for consumption by the APU powertrain. In the illustrated embodiment, each tank 104 is connected to a cold box 140 within the interior portion of the assembly 100. As will be described in further detail with respect to FIG. 6, each cold box 140 is configured to house and protect various components of the plumbing system 105, sensors, communications, and other components used to monitor and/or manage the hydrogen fuel, coolants, etc. The cold box also maintains a controlled internal environment for the plumbing system and other components for carefully controlling the flow of gassified hydrogen fuel from the assembly to the aircraft's fuel system.

Various lines 30 extend from the cold boxes 140 to either the ground servicing panel 120 or the quick connection assembly 130. For example, gaseous hydrogen release lines 33 and liquid hydrogen fill lines 35 are coupled between each of the hydrogen fuel tanks 104 and the ground servicing panel 120 through the cold boxes 140. Coolant-out lines 32, vent and vacuum lines 34, hydrogen fuel lines 36, and coolant-in lines 38 are coupled between each of the tanks 104 and the quick connection assembly 130 through the cold boxes 140. Each of these lines 30 will be described in further detail below.

The assembly 100 also includes an avionics bay 150 removably coupled to the housing 110. For example, the avionics bay 150 can include electrical or other control components mounted on a support tray 151 slidably coupled to rails mounted to a part of the frame 112 at the bottom portion 102d. The avionics bay 150 is movable between stowed and deployed positions. In the stowed position, the avionics bay 150 is positioned within the housing where the electrical or other control components are protected within the assembly's housing. In the deployed position, the avionics bay 150 is at least partially extended from the housing so the electrical or other control components on the support tray are accessible, such as for maintenance, repair, replacement, reconfiguration, etc. In the illustrated embodiment, the avionics bay 150 is configured to be moved between the stowed and deployed positions through the access hatch 118 at the bottom of the front portion 102a (FIG. 2A). As will be described in further detail below with respect to FIG. 7, the avionics bay 150 can includes various components (e.g., a controller) configured to control the other components of the tanks 104, the plumbing system 105, communications systems, or other components of the assembly 100 described above, whether on the ground or in flight. Once the avionics bay 150 is secured inside the housing 110, the access hatch 118 can be closed.

The assembly 100 also includes various sensors 106 (e.g., temperature sensors, pressure sensors, hydrogen-level sensors, hydrogen-leak sensors, communication sensors, connection sensors, etc.) configured to monitor the hydrogen fuel tanks 104, the cold box 140, and/or the interior portion of the assembly 100. For example, a pressure sensor can detect and communicate to an on-board controller in the avionics bay 150 that either the hydrogen fuel tank 104 or the housing 110 is over-pressurized and needs to be vented. The sensors 106 can detect whether the hydrogen fuel tanks 104 are being refilled with liquid hydrogen, whether the assembly 100 is being transported or loaded into the cargo bay 12, and/or whether the aircraft 10 is ready to receive gaseous hydrogen fuel via the quick connection assembly 130.

Figure 4:
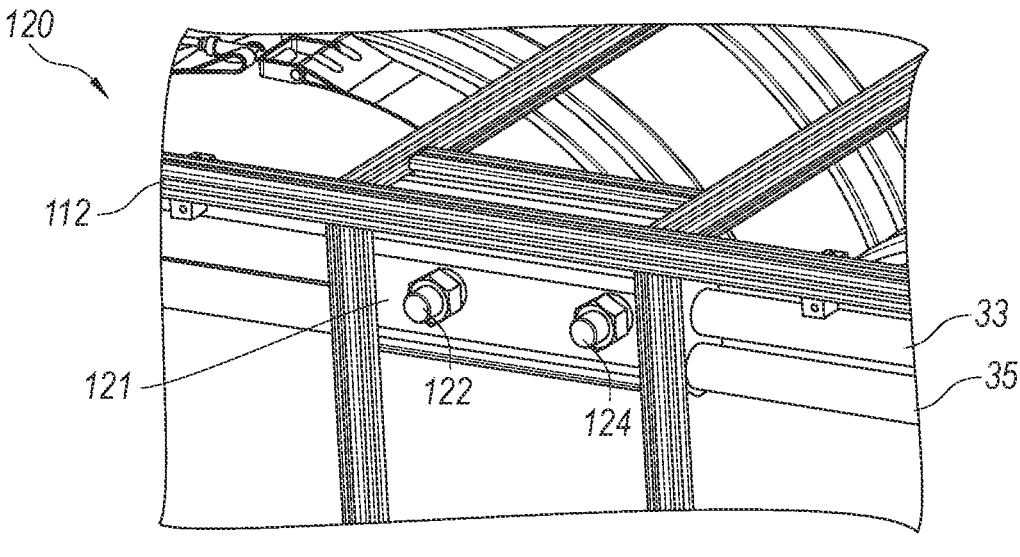
FIG. 4 is an enlarged perspective view of a ground servicing panel of the modular hydrogen-fuel storage assembly of FIG. 3 in accordance with embodiments of the present technology.

FIG. 4 is an enlarged perspective view of the ground servicing panel 120 in accordance with embodiments of the present technology. The ground servicing panel (GSP) 120 includes a GSP housing 121 configured to receive the gaseous hydrogen release lines 33 and the liquid hydrogen fill lines 35 extending from each of the hydrogen fuel tanks 104 through the cold box 140. The GSP housing 121 is coupled to the frame 112 proximate to the rear portion 102b and the top portion 102c of the assembly 100. The GSP 120 also includes a liquid hydrogen inlet 122 coupled to the liquid hydrogen fill lines 35 through the GSP housing 121 and a gaseous hydrogen outlet 124 coupled to the gaseous hydrogen release lines 33 through the GSP housing 121. The liquid hydrogen inlet 122 and the gaseous hydrogen outlet 124 can be valves configured to be coupled to lines and/or pipes external to the modular hydrogen-fuel storage assembly 100, and can be either open to allow fluid communication, at varying and controllable flow rates, between the external lines and the lines 33, 35 or closed to prevent fluid communication between the external line and the line 33, 35. The liquid hydrogen inlet 122 and/or the gaseous hydrogen outlet 124 can also include connectors, such as quick connect/disconnect connectors that allow the hydrogen release lines 33 and the liquid hydrogen fill lines 35 to be easily, quickly and securely connected to external lines to controllably direct hydrogen from or to the tanks.

In operation, the hydrogen fuel tanks 104 housed within the assembly 100 can be refilled with liquid hydrogen at a filling station outside of the aircraft 10 by coupling a liquid hydrogen fuel supply to the liquid hydrogen inlet 122. Also, any excess gaseous hydrogen inside the hydrogen fuel tanks 104 can be released via venting (e.g., to avoid over-pressurization) by either directly releasing the gaseous hydrogen into the atmosphere through the gaseous hydrogen outlet 124 or coupling a hydrogen gas tank to the gaseous hydrogen outlet 124 to collect the gaseous hydrogen and possibly store it for re-use. The GSP 120 allows the hydrogen fuel tanks 104 housed within the assembly 100 to be refilled and/or vented without removing the tanks 104 from the assembly 100, which can be difficult and time-consuming.

Figure 5:
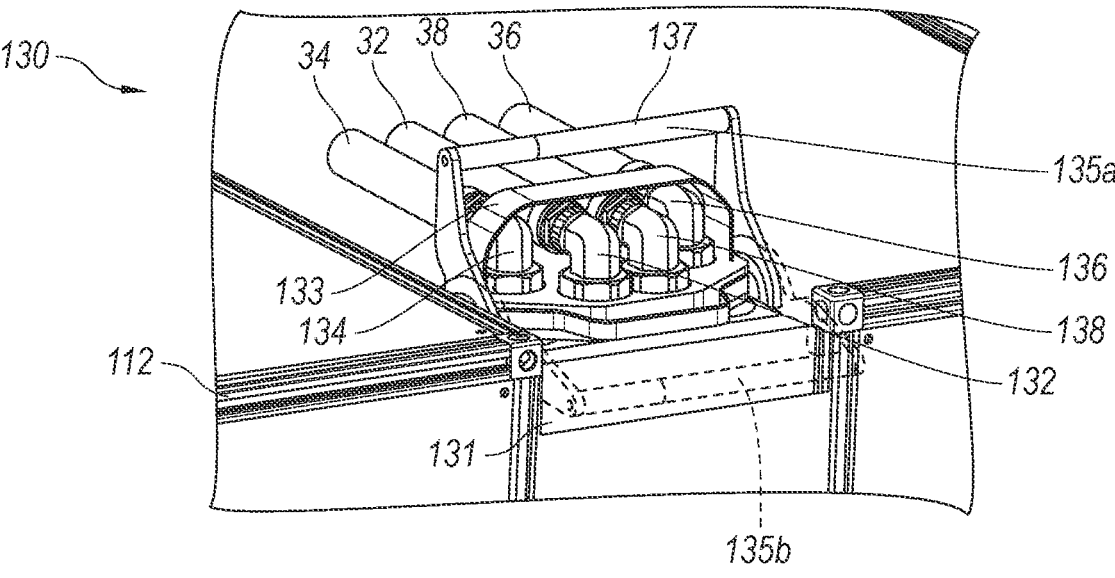
FIG. 5 is an enlarged perspective view of a quick connection assembly of the modular hydrogen-fuel storage assembly of FIG. 3 in accordance with embodiments of the present technology.

FIG. 5 is an enlarged perspective view of the quick connection assembly 130 in accordance with embodiments of the present technology. The quick connection assembly (QCA) 130 includes a QCA housing 131 configured to receive the coolant-out lines 32, the vent and vacuum lines 34, the hydrogen fuel lines 36, and the coolant-in lines 38 extending from the cold boxes 140 (coupling shown in FIG. 3). The QCA housing 131 is coupled to the frame 112 proximate to the front portion 102a and the top portion 102c of the assembly 100. The QCA 130 has a plurality of quick-connect connectors that engage mating connectors on incoming or outgoing fluid lines coupled to systems of the aircraft, such as fuel systems, vent systems, systems, etc. For example, the QCA 130 of the illustrated embodiment has a coolant outlet connector 132, a vent and vacuum outlet connector 134, a gaseous hydrogen outlet connector 136, and a coolant inlet connector 138. The coolant outlet connector 132 is configured to releasably connect to a mating quick connect connector of the coolant-out lines 32. The vent and vacuum outlet connector 134 is configured to releasably connect to a mating quick connect connector of the vent and vacuum lines 34, and the gaseous hydrogen outlet connector 136 is configured to releasably connect to a mating quick connect connector of the hydrogen fuel lines 36. The coolant inlet connector 138 is configured to releasably connect to a mating quick-connect connector of the coolant-in lines 38. Each of the lines 32, 34, 36, and 38 is configured to pass through a corresponding one of the inlets or outlets connectors 132, 134, 136, and 138 and coupled to the APU 20 or other powerplant of the aircraft 10. In some embodiments, the top or other portion of the assembly's housing 110 can include a recessed raceway configured to allow the fluid lines, such as the coolant-out lines 32, the vent and vacuum lines 34, the hydrogen fuel lines 36, and the coolant-in lines 38 to extend along the raceway without projection out of the external envelope of the housing 110.

The illustrated QCA 130 has a latch assembly 135 coupled to the coolant outlet connector 132, the vent and vacuum outlet connector 134, the gaseous hydrogen outlet connector 136, and the coolant inlet connector 138. The latch assembly 135 is movable between a locked position 135a and a released position 135b. When in the locked position 135a, the latch assembly 135 is configured to securely hold the outlet and inlet connectors 132, 134, 136, and 138 in sealed, locked mating engagement with the mating connectors on the lines 32, 34, 36, and 38 to allow for fluid (liquid or gas) to pass into or out of the assembly 100 via the connectors and the lines 32, 34, 36, and 38. In some embodiments, the outlet and inlet connectors 132, 134, 136, and/or 138 can include activatable valves to move between open and closed positions to control fluid flow through the connectors depending on whether the respective connector is attached to or released from the mating connector on the mating lines 32, 34, 36, and 38. When the latch assembly 135 is in the released position 135a, the latch assembly 135 is configured to allow the outlet and inlet connectors 132, 134, 136, and 138 to be disconnected and separated from the mating connectors on the respective lines 32, 34, 36, and 38. In the illustrated embodiment, the latch assembly 135 has a handle 137 configured to extend above the top portion 102c when the latch assembly 135 is in the locked position 135a, such that other assemblies 100 or conventional cargo units 50 (FIG. 1) can be stacked adjacent to the assembly 100 without hitting the latch assembly 135, the outlet and inlet connectors 132, 134, 136, and 138, or the mating lines connectors 32, 34, 36, and 38. However, the latch assembly 135 can still have a minimal footprint such that other assemblies 100 or conventional cargo units 50 do not hit the latch assembly 135 even when in the released position 135b. The QCA 130 can also include a shield 133 positioned over and configured to provide protection to the inlet and outlet connectors 132, 134, 136, and 138.

While the assembly 100 is being stored, transported, and/or loaded into the cargo bay 12, or otherwise not coupled to the APU 20, the latch assembly 135 is in the released position 135b to prevent various fluids (e.g., gaseous hydrogen, coolant) from leaking outside of the assembly. Once the assembly 100 is secured in the cargo bay 12 of the aircraft 10, the lines 32, 34, 36, and 38 can be quickly and easily coupled to the APU 20 or other power system and the latch assembly 135 can be manually or automatically switched to the locked position 135a to allow fluid communication through the lines 32, 34, 36, and 38. In operation, gaseous hydrogen is provided through the hydrogen fuel lines 36 to fuel cells of the hydrogen-powered APU 20 at a pressure level within the operational pressure range of the fuel cells of the APU's powerplant. In some embodiments, the hydrogen fuel lines 36 are used to fill the hydrogen fuel tanks 104 with liquid hydrogen, such as after the assembly 100 has been removed from the aircraft and transported to a filling station remote from the aircraft. When the assembly 100 is loaded into the aircraft, coolant is circulated through the coolant-in lines 38 and the coolant-out lines 32 for thermal management of portions of the APU's powerplant, including the fuel cells, as well as provide thermal management within the cold boxes 140, such as via heat exchangers through which the coolant can flow. The vent and vacuum lines 34 are configured to vent the tanks 104 and/or the interior area of the housing 110, for example, in the event that sensors 106 detect conditions indicating that gaseous hydrogen is at risk of over-pressurizing the tanks 104 and/or the assembly 100. In some embodiments, the vent and vacuum lines 34 are coupled to a gaseous hydrogen release valve located in the cargo bay 12 which can be coupled to vent line activatable to draw gaseous hydrogen away from the module and vent to the external ambient environment exterior of the aircraft.

Figures 6, 7:
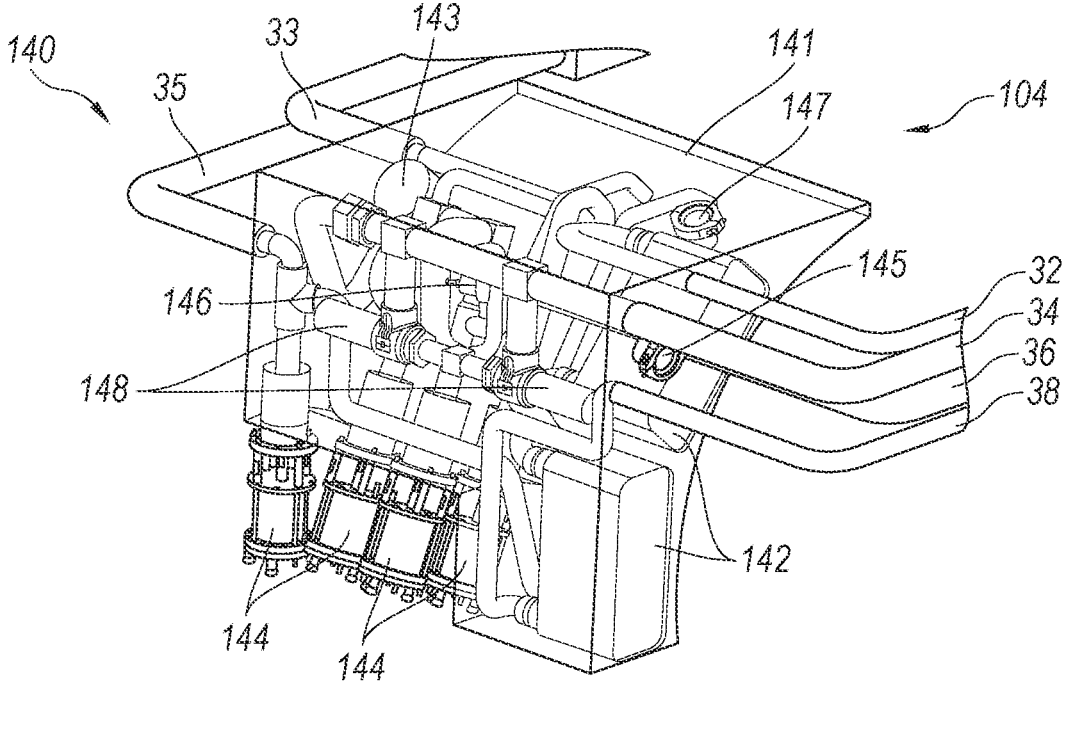
FIG. 6 is an enlarged perspective view of a cold box of the modular hydrogen-fuel storage assembly of FIG. 3 in accordance with embodiments of the present technology.
FIG. 7 is an enlarged perspective view of an avionics bay of the modular hydrogen-fuel storage assembly of FIG. 3 in accordance with embodiments of the present technology.

FIG. 6 is an enlarged perspective view of the cold box 140 in accordance with embodiments of the present technology. As discussed above, each hydrogen fuel tank 104 can have its own cold box 140 secured within the housing 110, and the cold box 140 is fluidly coupled to the gaseous hydrogen release lines 33, the liquid hydrogen fill lines 35, the coolant-out lines 32, the vent and vacuum lines 34, the hydrogen fuel lines 36, and the coolant-in lines 38. The cold box 140 includes a cold box housing 141 configured to protect some or all of the other components of the cold box 140. The cold box housing 141 can be coupled to the exterior of the hydrogen fuel tank 104. In some embodiments, the cold box housing 141 is separate from the hydrogen fuel tank 104 and/or fully encloses the various components of the cold box 140.

The cold box housing 141 is configured to provide a sealed structure with an interior area that is maintained at a selected vacuum or low pressure level and at a controlled temperature level. The cold box 140 includes portions of the plumbing system 105, along with one or more heat exchangers 142, a pressure relief device (PRD) 143, one or more shutoff valve actuators 144, a cold box vacuum port 145, a pressure regulating valve (PRV) 146, a tank valve 147, and multiple safety relief valves (SRVs) 148. In the illustrated example, the shutoff valve actuators 144 are positioned exterior of the cold box housing 141. The cold box vacuum port 145 can provide fluid communication between the inside of the cold box housing 141, which can be fluidly coupled to the tank 104 via the tank valve 147, and the interior portion of the assembly 100. Accordingly, these components are exterior of the tank and accessible within the interior area of the cold box 140, while also being maintained in a controlled environment different than the environment within the tanks 104 and different than the ambient environment surrounding the assembly 100.

In operation, a first heat exchanger 142 can be configured to facilitate heat transfer from the coolant-in lines 38 (e.g., carrying coolant from the APU 20) and the liquid hydrogen fill lines 35 (e.g., carrying cryogenic liquid hydrogen), and a second heat exchanger 142 is configured to facilitate heat transfer from the coolant-out lines 32 (e.g., carrying coolant to the APU 20) to the hydrogen fuel lines 36 (e.g., carrying gaseous hydrogen fuel to the APU 20). The PRD 143, the cold box vacuum port 145, the PRV 146, the tank valve 147, and the SRVs 148 function together (and with the sensors 106 in some embodiments) to facilitate controlled delivery of the hydrogen fuel from the hydrogen fuel tanks 104 to the aircraft's fuel system and to the APU and/or other powertrain, and also to facilitate venting of the gaseous hydrogen through the vent and vacuum lines 34 as needed to maintain pressures within selected levels.

FIG. 7 is an enlarged perspective view of the avionics bay 150 in accordance with embodiments of the present technology. As discussed above with respect to FIGS. 2 and 3, the avionics bay 150 can be removably coupled to the bottom portion 102d of the modular hydrogen-fuel storage assembly 100 and accessed via the access hatch 118. In the illustrated embodiment, the avionics bay 150 includes the support tray 151 that removably supports electrical components, such as a controller 152 (e.g., a microcontroller), a power management unit (PMU) 154, a power source 156 (e.g., a battery), and one or more relay boxes 158, all of which can be fixed in position on the support tray 151. The support tray 151 is coupled to rails 153 configured to allow the avionics bay 150 to be slidably movable relative to the bottom portion 102d between the stowed and deployed positions.

In operation, the PMU 154 and the relay boxes 158 control the power provided to the controller 152 and/or other components of the assembly 100 by the battery 156. The controller 152 can be configured to receive data from the sensors 106, such as information regarding each of the hydrogen fuel tanks 104 (e.g., liquid hydrogen fill level, tank pressure, tank temperature) and the assembly 100 (e.g., assembly internal pressure, gaseous hydrogen concentration in the assembly's interior portion). The controller 152 can be further configured to control various components of the assembly 100, such as flow valves, the shutoff valve actuators 144, etc. In some embodiments, the controller 152 is configured to switch between a ground mode and a flight mode based on data communicated from the sensors 106 and/or whether the assembly 100 is coupled to the APU 20 via the quick connection assembly 130. When in the ground mode, the controller 152 can be configured to prevent gaseous hydrogen fuel from flowing out of the assembly 100 while still maintaining cryogenic conditions of the tanks 104. When in the flight mode, the controller 152 can be configured to control and monitor the flow of gaseous hydrogen fuel to the powertrain of the APU 20 or other powerplant.

Figure 8A:
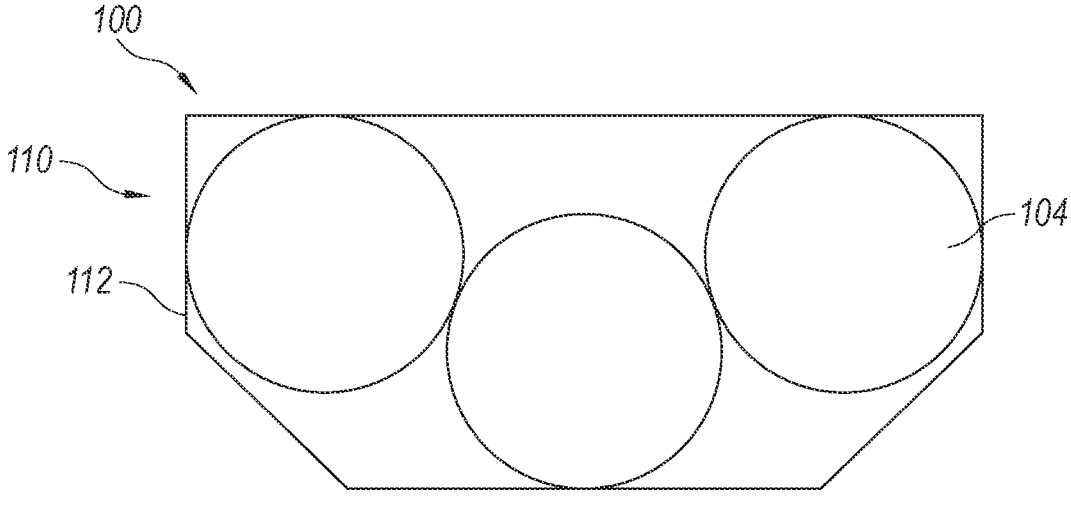
FIGS. 8A and 8B are enlarged schematic, sectional views of a modular hydrogen-fuel storage assembly in accordance with embodiments of the present technology.
Figure 8B:
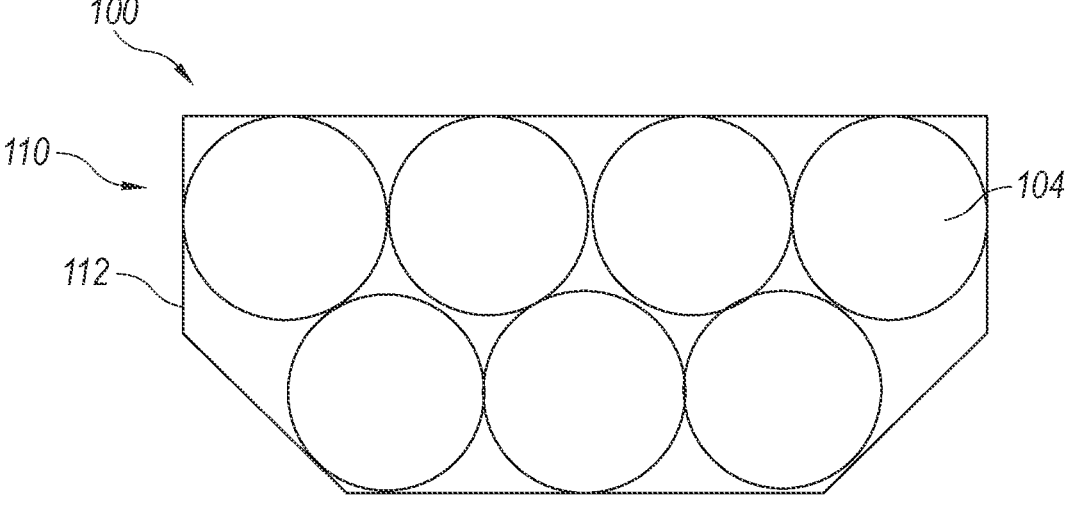

FIGS. 8A and 8B are enlarged schematic, sectional views of the modular hydrogen-fuel storage assembly 100 in accordance with embodiments of the present technology. The assembly 100 can be sized and shaped to house different numbers of hydrogen fuel tanks 104 in various arrangements. For example, as shown in the illustrated embodiments, the assembly 100 can be configured to house three (FIG. 8A) or seven (FIG. 8B) cylindrical hydrogen fuel tanks 104 within the frame 112 of the housing 110. In other embodiments, fewer or more tanks 104 can be housed within the assembly 100, such as by increasing or decreasing the size of each tank 104 and/or stacking the tanks 104 behind another (as opposed to stacking them on the same plane, as shown). In other embodiments, three or seven hydrogen fuel tanks 104 can be stored in an arrangement different from the illustrated arrangements.

Figure 9:
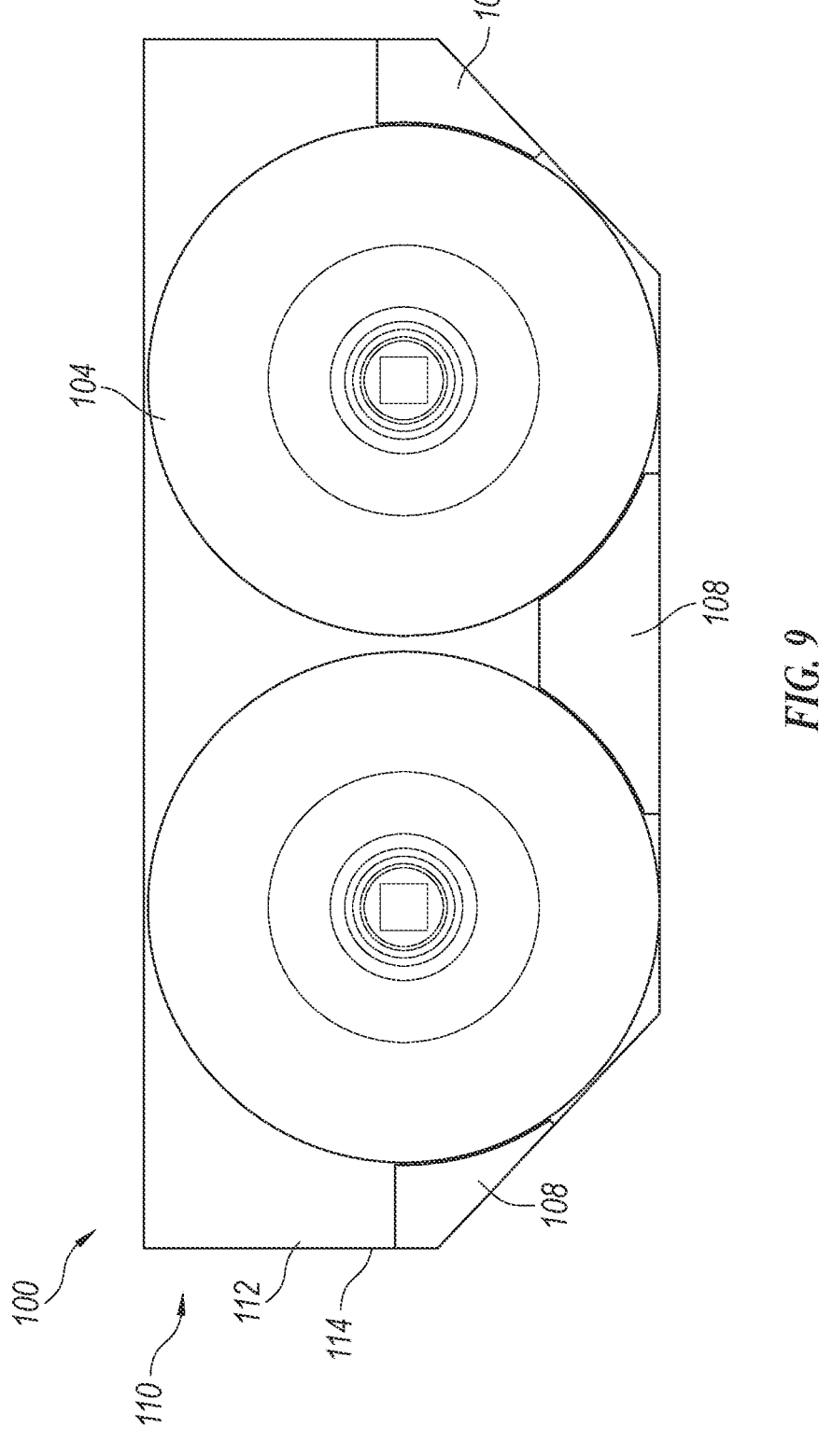
FIG. 9 is a schematic, sectional view of a modular hydrogen-fuel storage assembly in accordance with embodiments of the present technology.

FIG. 9 is a schematic, sectional view of the modular hydrogen-fuel storage assembly 100 in accordance with embodiments of the present technology. As illustrated, the internal cradle system 108 can include one or more rigid, durable frames that contain, support, stabilize, and protect the hydrogen fuel tanks 104. The frames can have an exterior form factor and footprint corresponding to a ULD container, such as an LD3-45 cargo container. The frames can have an exterior form factor and footprint corresponding to any ULD compatible with any cargo bay. In the illustrated embodiment, the internal cradle system 108 releasably contains two tanks 104 arranged in a side-by-side configuration, configuring the assembly 100 to have a hydrogen capacity of approximately 90 kg, although other embodiments or configurations can have other capacities.

Figure 10:
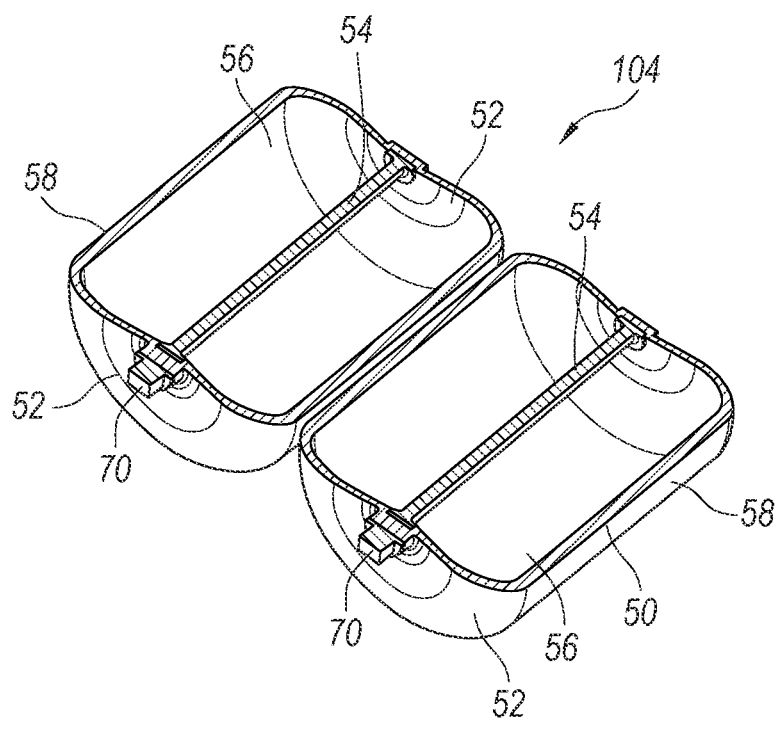
FIG. 10 is a sectional view of a hydrogen fuel tank in accordance with embodiments of the present technology.

FIG. 10 is a sectional view of the hydrogen fuel tank 104 in accordance with embodiments of the present technology. The tank 104 can be of the type as described and shown in Applicant's pending U.S. patent application Ser. No. 17/515, 089, titled Systems and Methods for Storing Liquid Hydrogen, filed Oct. 29, 2021, which is incorporated herein in its entirety by reference thereto. For example, in the illustrated embodiment, the tank 104 is configured to store liquid hydrogen and has a cylindrical body with toroidal or dimpled ends 52. The tank 104 with the dimpled ends 52 provides a greater volumetric efficiency by maximizing the cylinder volume of the tank 104 carried within the modular hydrogen-fuel storage assembly 100. The shape of the cylindrical tanks 104 with dimpled ends 52 can also provide a significantly lighter structural weight compared to a volumetrically equivalent cylindrical pressure vessel with flat ends.

The tank 104 of the illustrated embodiment can have a tie rod 54 extending through the tank 104 and interconnecting the dimpled ends 52. The tie rod 54 is configured to carry tensile loads and to alleviate and redistribute the structural loads exerted on the tank 104, an internal liner 56, and/or the structural external shell 58 of the tank. In some embodiments, the tie rod 54 can be solid, hollow, or other structural arrangement, and the tie rod 54 can comprise aluminum alloys, steel alloys, carbon fiber, fiberglass, or any combination thereof. Accordingly, the hydrogen fuel tank 104 may not need additional structural members to manage pressure loads within the tank 104, which can result in a lighter tank assembly. The tank 104 can include an integral plumbing system 70, which will be described in further detail below with respect to FIG. 11.

The hydrogen fuel tank 104 of the illustrated embodiment is a refillable, insulated tank configured to safely contain the liquid hydrogen fuel at cryogenic temperatures and at a selected pressure range, such as approximately 4-6 bar or preferably up to approximately 7 bar. The tanks can be configured with multi-layer insulation captured in a vacuum environment between layers of the tank so as to maximize the tank's hold time of the hydrogen fuel (e.g., 96 hours, 150 hours, 200 hours).

Figure 11:
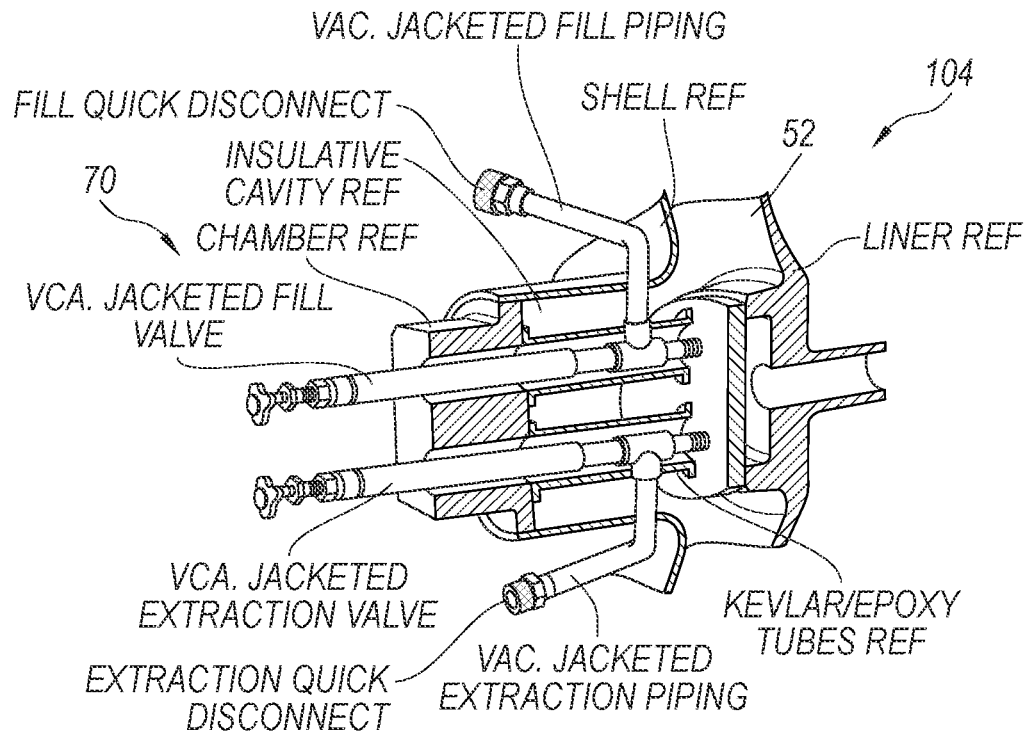
FIG. 11 is an enlarged sectional view of a plumbing system of the hydrogen fuel tank of FIG. 7 in accordance with embodiments of the present technology.

FIG. 11 is an enlarged sectional view of the integral plumbing system 70 of the hydrogen fuel tank 104 in accordance with embodiments of the present technology. The plumbing system 70 communicates with the internal volume of the tank 104 to allow flow of the hydrogen fuel into the tank 104 (i.e., during refueling). The plumbing system 70 can also allow for a controlled flow of hydrogen fuel out of the tank 104 for use by a fuel cell, motor, powertrain, APU, or other hydrogen-powered or consuming component. The plumbing system 70 may also be configured to control and manage the pressure within the hydrogen fuel tank 104. The plumbing system 70 can have an insulated chamber arrangement with fill and outflow lines with quick connect/disconnect fittings, and the fill and outflow lines can be coupled to vacuum-jacketed fill and outflow valves, as shown. In some embodiments, the plumbing system 70 can be operatively coupled to the various components of the modular hydrogen-fuel storage assembly 100 as illustrated in FIG. 3.

Figure 12:
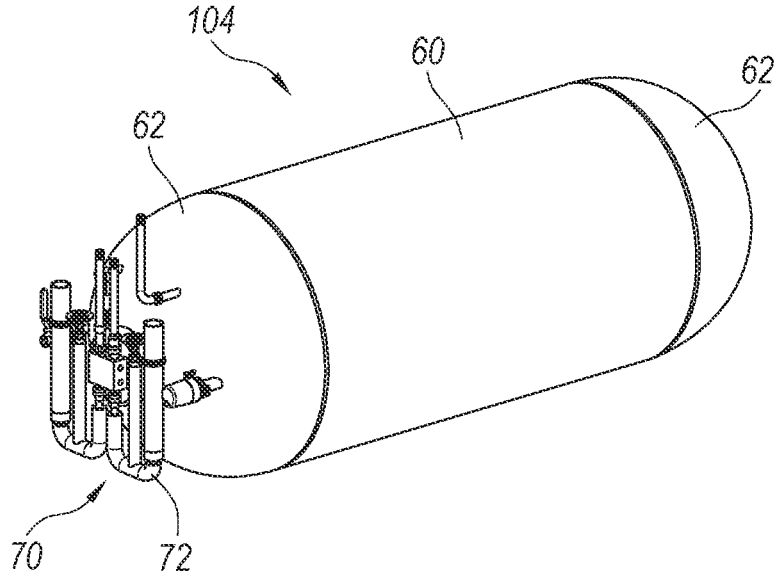
FIG. 12 is a perspective view of a hydrogen fuel tank in accordance with embodiments of the present technology.
Figure 13:
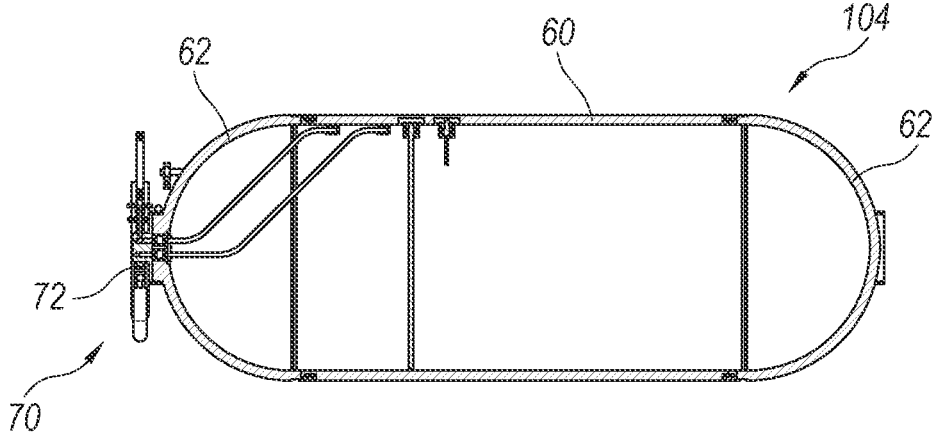
FIG. 13 is a sectional view of the hydrogen fuel tank of FIG. 12 in accordance with embodiments of the present technology.

FIG. 12 is a perspective view of the hydrogen fuel tank 104 in accordance with embodiments of the present technology. FIG. 13 is a sectional view of the hydrogen fuel tank 104 in accordance with embodiments of the present technology. Referring to FIGS. 12 and 13 together, the tank 104 can have a cylindrical body 60 with hemispherical ends 62. In other embodiments, the ends of the cylindrical body 60 may be domed, partially spherical, conical, or any combination thereof. Further, by coupling the plumbing system 70 to the assembly 100, the fixed equipment required to be installed and carried by the aircraft 10 can be significantly reduced. The flexibility and serviceability of the assembly 100 is increased, allowing the assembly 100 to be serviced independently without causing any downtime for the aircraft 10. In yet other embodiments, the hydrogen fuel tank 104 can be configured for storage of high-pressure gaseous hydrogen fuel, such as the tank assemblies shown and disclosed in detail in Applicant's U.S. patent application Ser. No. 17/318,986, titled Fuel Storage Module Assembly, filed May 12, 2021, which is incorporated herein in its entirety by reference thereto.

While preferred embodiments of the present disclosure have been shown and described herein, it will be obvious to those skilled in the art that such embodiments are provided by way of example only. It is not intended that the disclosure be limited by the specific examples provided within the specification. While the disclosure has been described with reference to the aforementioned specification, the descriptions and illustrations of the embodiments herein are not meant to be construed in a limiting sense. Numerous variations, changes, and substitutions will now occur to those skilled in the art without departing from the disclosure. It shall be understood that all aspects of the disclosure are not limited to the specific depictions, configurations, or relative proportions set forth herein, which depend upon a variety of conditions and variables. It should be understood that various alternatives to the embodiments of the disclosure described herein may be employed in practicing the disclosure. It is therefore contemplated that the disclosure shall also cover any such alternatives, modifications, variations, or equivalents. It is intended that the following claims define the scope of the disclosure and that methods and structures within the scope of these claims and their equivalents be covered thereby.

We claim:

1. A modular hydrogen-fuel storage assembly, comprising:
   a refillable, reusable hydrogen fuel tank configured to contain hydrogen fuel;
   a housing with a front portion, a rear portion, a top portion, a bottom portion, and an interior portion, wherein the hydrogen fuel tank is contained within the interior portion, and wherein the housing is configured to have a size and shape corresponding to a Unit Load Device (ULD) cargo container;
   a hydrogen-fuel plumbing system positioned within the housing and connected to the hydrogen fuel tank for carrying hydrogen fuel to and from the hydrogen fuel tank;
   a cold box contained within the housing, and at least a portion of the hydrogen-fuel plumbing system is contained in the cold box;
   a quick connection assembly coupled to the hydrogen fuel tank and positioned adjacent to the top portion of the housing, the quick connection assembly having one or more connectors configured to releasably connect with one or more external fuel lines coupled to an auxiliary power unit (APU) of an aircraft;
   a ground servicing panel coupled to the housing and coupled to the hydrogen fuel tank; and
   an electronics bay operatively coupled to the hydrogen fuel tank and removably contained in the interior portion of the housing;
   wherein the modular hydrogen-fuel storage assembly is configured to be loaded into a cargo bay of the aircraft.

2. The modular hydrogen-fuel storage assembly of claim 1, wherein the quick connection assembly comprises:
   a gaseous hydrogen outlet coupled to the hydrogen fuel tank;
   a coolant inlet coupled to the cold box;
   a coolant outlet coupled to the cold box;
   a vent and vacuum outlet coupled to the cold box; and
   a latch connected to the connectors and being movable between locked and released positions;
   wherein the gaseous hydrogen outlet, the coolant inlet, the coolant outlet, and the vent and vacuum outlet are configured to be coupled to the APU;
   wherein the gaseous hydrogen outlet, the coolant inlet, the coolant outlet, and the vent and vacuum outlet are configured to be open when the latch is in the locked position, and
   wherein the gaseous hydrogen outlet, the coolant inlet, the coolant outlet, and the vent and vacuum outlet are configured to be closed when the latch is in the released position.

3. The modular hydrogen-fuel storage assembly of claim 1, wherein the ground servicing panel comprises:
   a liquid hydrogen inlet; and
   a gaseous hydrogen venting outlet,
   wherein the liquid hydrogen inlet is configured to be coupled to a liquid hydrogen supply when the modular hydrogen-fuel storage assembly is outside of the aircraft.

4. The modular hydrogen-fuel storage assembly of claim 1, wherein the electronics bay comprises a plurality of electrical components retained on a support tray, wherein the support tray is movable relative to the housing between a stowed and deployed positions, in the stowed position the support tray and electronic components are within the housing, and in the deployed position the support tray and electronic components are at least partially exterior of the housing.

5. The modular hydrogen-fuel storage assembly of claim 4, wherein the housing has rails adjacent to the bottom portion, and the support tray is slidably coupled to rails and movable along the rails between the stowed and deployed positions.

6. The modular hydrogen-fuel storage assembly of claim 1, further comprising sensors configured to monitor the one or more hydrogen fuel tanks, wherein the electronics bay comprises a controller operatively coupled to the sensors, and wherein the controller is configured to switch between a ground mode and a flight mode.

7. The modular hydrogen-fuel storage assembly of claim 1, further comprising a ventilation line coupled to the interior portion of the housing and configured to vent gaseous hydrogen out of the interior portion to the cargo bay or to an ambient environment exterior of the aircraft.

8. A modular hydrogen-fuel storage assembly, comprising:
  a refillable, reusable liquid hydrogen fuel tank;
  a housing with an interior portion, wherein the hydrogen fuel tank is contained within the interior portion, and wherein the housing has a size and shape corresponding to a Unit Load Device (ULD) cargo container;
  a hydrogen-fuel plumbing system positioned within the housing and connected to the hydrogen fuel tank for carrying hydrogen fuel to and from the hydrogen fuel tank;
  a connection assembly coupled to the hydrogen fuel tank and positioned adjacent to the top portion of the housing, the connection assembly having one or more connectors configured to releasably connect with one or more external fuel lines coupled to an external power train of an aircraft; and
  a controller operatively coupled to the hydrogen fuel tank and removably contained in the interior portion of the housing;
wherein the modular hydrogen-fuel storage assembly is configured to be loaded into a receiving bay of a vehicle and connected to a hydrogen-powered powertrain of the vehicle.

9. The modular hydrogen-fuel storage assembly of claim 8, further comprising a hydrogen-fuel plumbing system positioned within the housing and connected to the liquid hydrogen fuel tank for carrying hydrogen fuel to and from the liquid hydrogen fuel tank, and a cold box contained within the housing, and at least a portion of the hydrogen-fuel plumbing system is contained in the cold box.

10. The modular hydrogen-fuel storage assembly of claim 8, wherein the housing comprises an internal frame structure and a plurality of closure panels attached to the internal frame to define an interior portion of the housing that contains the liquid hydrogen fuel tank, wherein at least one of the panels is an openable panel movable between open and closed positions, wherein the openable panel in the open position is spaced apart from an interior portion of the housing to allow access to the liquid hydrogen tank, and the openable panel in the closed position covers the interior portion encloses the interior portion of housing to block access to the liquid hydrogen fuel tank.

11. A method of providing a modular hydrogen-fuel storage assembly to an aircraft, comprising:
  loading the modular hydrogen-fuel storage assembly into a cargo bay of the aircraft, wherein the modular hydrogen-fuel storage assembly contains a liquid hydrogen fuel tank and a quick connection assembly fluidly coupled to the liquid hydrogen fuel tank;
  securing the modular hydrogen-fuel storage assembly at a first position inside the cargo bay; and
  coupling a plurality of lines extending from a hydrogen-powered powertrain of the aircraft to a quick connection assembly of the modular hydrogen-fuel storage assembly,
  wherein the quick connection assembly is positioned at a top portion of the modular hydrogen-fuel storage assembly, and
  wherein the modular hydrogen-fuel storage assembly is configured to have a size and shape corresponding to a Unit Load Device (ULD) cargo container corresponding to a configuration of the cargo bay of the aircraft.

12. The method of claim 11, further comprising:
  prior to loading the modular hydrogen-fuel storage assembly into the cargo bay of the aircraft, filling the liquid hydrogen fuel tank stored inside the modular hydrogen-fuel storage assembly with liquid hydrogen through a ground servicing panel of the modular hydrogen-fuel storage assembly at a location remote from the aircraft.

13. The method of claim 11 wherein the modular hydrogen-fuel storage assembly has a housing that contains the liquid hydrogen fuel tank and an electronics bay with electronic components on a support tray and coupled to the liquid hydrogen fuel tank, the method further comprising accessing the interior area of the housing and moving the support tray relative to the housing from a stowed position within the interior area to a deployed position at least partially exterior of the interior area of the housing.

14. The method of claim 11 wherein the modular hydrogen-fuel storage assembly is a first modular hydrogen-fuel storage assembly, and wherein the liquid hydrogen fuel tank is filled with the liquid hydrogen fuel to a fill level, and the method further comprises removing the first modular hydrogen-fuel storage assembly from a cargo bay after liquid hydrogen fuel has been withdrawn from the fuel tank via activation of the powertrain, and loading a second modular hydrogen-fuel storage assembly into the cargo bay to replace the first modular hydrogen-fuel storage assembly.

* * * * *